United States Patent

Klimek

[11] 4,045,768
[45] Aug. 30, 1977

[54] LOW PRESSURE SELECTOR

[75] Inventor: Boleslaw M. Klimek, Des Plaines, Ill.

[73] Assignee: The Echlin Manufacturing Company, Branford, Conn.

[21] Appl. No.: 721,818

[22] Filed: Sept. 9, 1976

[51] Int. Cl.² ............................................. B60T 17/22
[52] U.S. Cl. ................................. 340/52 C; 303/6 C;
 188/151 A; 116/65
[58] Field of Search ...................... 340/52 C, 240, 242;
 303/6 C, 84 R; 188/151 A; 137/555, 557;
 116/58, 65

[56] References Cited

FOREIGN PATENT DOCUMENTS 2,000,843  7/1971  Germany ........................... 340/52 C

*Primary Examiner*—Alvin H. Waring
*Attorney, Agent, or Firm*—Neuman, Williams, Anderson & Olson, et al.

[57] ABSTRACT

A low pressure selector for communicating therethrough fluid from the lower pressure source of a pair of pressure sources includes a housing with input ports for connection to the pressure sources and an output port. A piston member is mounted within a cavity, advantageously formed by walls of the housing, for reciprocating movement therein in response to pressure supplied from the pair of pressure sources to the input ports. Sealing members provided on the piston member cooperatively operate with the walls of the housing cavity and the piston member, to effectuate communication of fluid from the lower pressure source to the output port. The low pressure selector is advantageously employed in a vehicle pneumatic brake system to communicate the fluid from the lower pressure source of first and second sources of supply pressure of the system to a low pressure responsive monitor which warns the operator of the vehicle of a drop in supply pressure from either source below a preset minimum.

18 Claims, 5 Drawing Figures

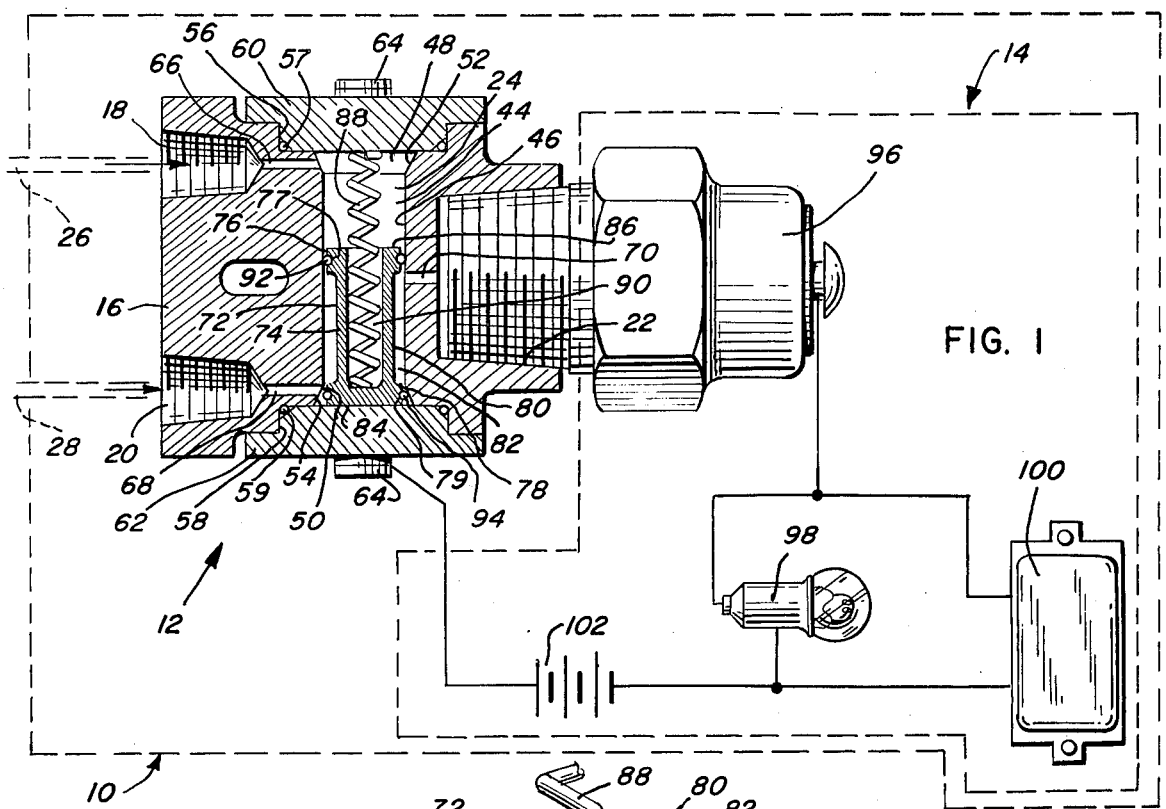

LOW PRESSURE SELECTOR

BACKGROUND OF THE INVENTION

This invention relates to apparatus for selectively communicating therethrough fluid from one of a plurality of sources. More particularly, it relates to a low pressure selector for communicating therethrough fluid from the lower pressure source of a plurality of pressure sources.

In vehicle pneumatic braking systems, it is desirable to monitor supply pressure available for braking usage to detect any condition in which supply pressure falls to an unacceptable level. Low pressure responsive monitors have been designed for monitoring pressure in such systems which, until recently, have generally empolyed a unitary source of supply pressure. Such low pressure responsive monitors typically warn the operator of the vehicle of a reduction in pressure by dropping a warning flag into the operator's view. One such low pressure responsive monitor is the Automatic Low-Pressure Signal monitor, Part No. 920, manufactured by The Berg Manufacturing Company, a Division of The Echlin Manufacturing Company.

In recent years, however, vehicle pneumatic braking systems have been developed which employ two sources of supply pressure. Monitoring pressure in such systems can be accomplished by employing two low pressure responsive monitors, each connected to one of the sources. Such use of two monitors may be expensive, however, and presents difficulties in the placement and mounting of the additional monitor. Consequently, it is desirable to obviate the duplication of monitors required by the aforementioned arrangements and the costs and installation problems attendant such duplication. This invention is directed to a low pressure indicator apparatus wherein a novel low pressure selector communicates fluid from the lower pressure source of a plurality of pressure sources to a low pressure responsive monitor.

OBJECTS OF THE INVENTION

Accordingly, it is an object of this invention to provide an improved pressure selector for selectively communicating therethrough fluid from one of a plurality of pressure sources.

More specifically, it is an object of this invention to provide an improved low pressure selector for communicating therethrough fluid from the lower pressure source of a pair of pressure sources.

It is another object of this invention to provide an improved, low cost, low pressure selector which can be employed in a low pressure indicator apparatus in a vehicle pneumatic brake system to effectuate monitoring of pressure of a plurality of sources of supply pressure.

Other objects, advantages and capabilities of the present invention will become apparent as the description thereof proceeds.

SUMMARY OF THE INVENTION

A low pressure selector according to this invention includes a housing having a cavity formed by walls therein and first, second and third ports. A piston member is mounted within the cavity of the housing for reciprocating movement therein between first and second positions in response to pressure appearing at the second and third ports. A drop in pressure appearing at the third port relative to pressure appearing at the second port causes the piston member to move to the first position and a drop in pressure appearing at the second port relative to pressure appearing at the third port causes the piston member to move to the second position. Sealing members cooperatively operate with the piston and the walls of the housing forming the cavity to permit communication between the first port and the third port and prevent communication between the first port and the second port when the piston member is in the first position and to permit communication between the first port and the second port and prevent communication between the first port and the third port when the piston member is in the second position. In a more specific embodiment of this invention, a low pressure monitor is connected to the first port.

BRIEF DESCRIPTION OF THE DRAWINGS

For a more complete understanding of this invention, reference should now be had to the embodiment illustrated in greater detail in the accompanying drawings and described by way of an example of the invention. In the drawings:

FIG. 1 shows low pressure indicator apparatus employing principles of this invention, and includes an axial sectional view of a low pressure selector according to this invention;

FIG. 2 shows an axial sectional view of an alternative embodiment of low pressure indicator apparatus employing principles of this invention;

FIG. 3 is an enlarged, fragmentary view of a portion of a piston and piston cavity of the low pressure selector of FIG. 1;

While the invention will be described in connection with a preferred embodiment, it will be understood that the invention is not limited thereto. On the contrary, it is intended to cover all alternatives, modifications and equivalents as may be included within the spirit and scope of the invention disclosed herein.

DETAILED DESCRIPTION OF THE PREFERRED EMBODIMENT

Figure 5:
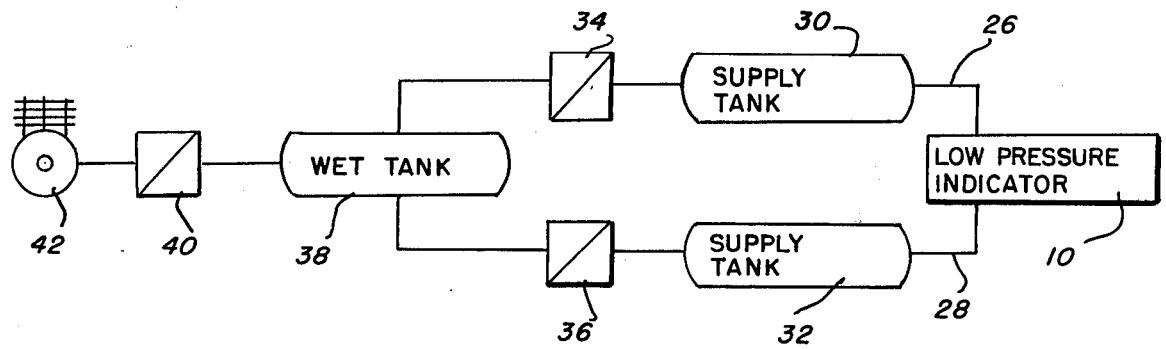
FIG. 5 shows a portion of a dual supply braking system with a low pressure indicator apparatus according to this invention connected thereto.

Referring now to the drawings wherein like reference characters indicate like parts throughout the several views, low pressure indicator apparatus 10 in FIG. 1 comprises a low pressure selector shown generally at 12 which is connected to a low pressure responsive monitor shown generally at 14. The low pressure selector 12 includes a housing 16 having first and second inlet ports 18 and 20, an outlet port 22 and a cavity 24 therein. The inlet ports 18 and 20 are adapted for connection to lines 26 and 28 from supply tanks 30 and 32 (FIG. 5), respectively, which supply tanks are, in turn, connected through individual check valves 34 and 36 to a wet tank 38 which is, in turn, coupled through a check valve 40 to a compressor 42.

Figure 4:
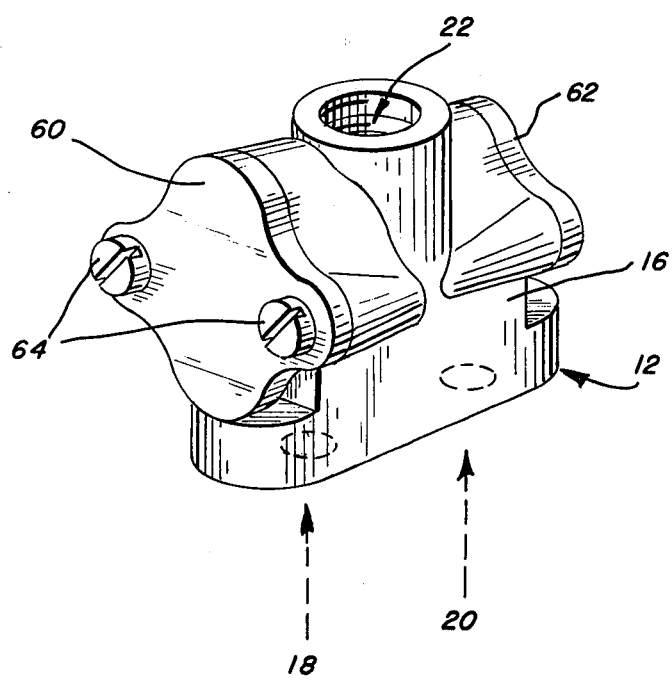
FIG. 4 is an oblique view of the low pressure selector shown in FIG. 1.

The cavity 24 (FIG. 1) includes a cylindrical portion 44 defined by a first wall 46 of a first diameter and first and second frustoconical portions 48 and 50 adjoining respective opposite ends of the wall 46 and defined by second and third walls 52 and 54 having segments of a second diameter greater than the first diameter. The cavity terminates at each end in housing recesses 56 and 58 which receive sealing members 57 and 59 and closing end members 60 and 62 secured to the housing by screws 64 (most clearly seen in FIG. 4) which engage tapped holes (not shown) in the housing. The first and second inlet ports 18 and 20 and the outlet ports 22 are in communication with the first and second frustoconical portions 48 and 50 and the cylindrical portion 44, respectively, through housing passages 66, 68 and 70, respectively.

A piston 72 is mounted for reciprocal movement within the cavity 24 between first and second positions in response to pressure appearing at the inlet ports 18 and 20. The piston 72 comprises a generally cylindrical body 74 having surface portions 76 and 78, of a first diameter, at its respective ends. The surface portions 76 and 78 have annular recesses 77 and 79, respectively. The body 74 includes a central surface portion 80, of a second diameter less than the first diameter, between the surface portions 76 and 78. The surface portion 80 generally cooperates with the wall 46 to define an annular passage 82 about the piston 72.

The end member 62 forms a limit stop engageable with an undersurface 84 of the piston 72 to limit the movement of the piston downwardly as seen in the drawings (most clearly seen in FIG. 3). The end member 60 forms a limit stop engageable with a top surface 86 of the piston 72 to limit the movement of the piston upwardly as seen in the drawings. The undersurface 84 and top surface 86 are roughened to prevent the formation of seals between the undersurface 84 and the contacting portion of end member 62 and between the top surface 86 and the contactual portion of end member 60.

During charging of the low pressure selector 12, "locking" of the piston 72 in a position intermediate the aforementioned first and second positions may occur if pressures being supplied to the inlet ports 18 and 20 by the pair of pressure sources 30 and 32 are substantially equal. It will be appreciated that such locking of the piston may be prevented by controlling charging of the selector 12 such that pressures supplied to the inlet ports 18 and 20 are not substantially equal. In the preferred embodiment, however, the need for such control during charging is obviated by a helical, compression spring 88, of a predetermined spring rate or constant, coaxially mounted in a cavity 90 extending inwardly of the piston 72 from the top surface 86 thereof. The spring 88 engages the end member 60 and biases the piston away from the end member 60 toward the end member 62, to the position shown in the drawings, i.e., the "first position."

The piston 72 includes sealing members 92 and 94 mounted respectively in the annular recesses 77 and 79. The sealing members 92 and 94 are disposed to selectively sealably engage the wall 46 of the housing. One or the other of these sealing members 92 and 94 always engages the wall 46 of the cavity 24 to at least partially define the axis of movement of the piston 72. More specifically, when the piston 72 is disposed in the first position shown by the drawings, the sealing member 92 sealingly engages wall 46 (FIG. 1). When piston 72 is at its opposite travel limit, the "second position," sealing member 94 sealingly engages wall 46.

The piston 72 is of sufficient length that neither of the sealing members 92 and 94 ever travels fully past the passage 70. Thus, when the piston 72 is in the first position, inlet 20 is permitted communication with outlet 22 by cooperative operation of the piston 72 and the sealing member 94 and the cavity frustoconical portion 50 (FIG. 3) while communication between inlet 18 and outlet 22 is prevented by the cooperative operation of the piston 72 and sealing member 92 with the cavity wall 46. When the piston 72 is in the second position, inlet 18 is permitted communication with outlet 22 by the cooperative operation of the piston 72 and sealing member 92 with the cavity frustoconical portion 48 while communication between inlet 20 and outlet 22 is prevented by cooperative operation of the piston 72 and sealing member 94 with the cavity wall 46.

The frustoconical portions 48 and 50 of the cavity 24 guide the sealing members 92 and 94 which extend beyond the wall 46 of the cavity 24 back into engagement with the wall 46. It should be appreciated, however, that any cavity portions having segments of enlarged diameter could be employed adjacent the ends of the wall 46 if suitable guide ribs are machined into the body 74 of the piston 72.

The low pressure responsive monitor 14 (FIG. 1) employed with the low pressure selector 12 comprises conventional elements including a low pressure switch 96, a light 98, a buzzer 100 and a power supply 102, which are mechanically and electrically coupled together with the low pressure selector 12. The low pressure switch 96 is connected to the outlet port 22 of the low pressure selector 12 and monitors the pressure appearing at the outlet 22. When pressure appearing at the outlet 22 falls below a preset minimum, the low pressure switch 96 will close, completing the electrical circuit between the power supply 102 and the light 98 and buzzer 100, thereby signaling the existence of a low pressure condition. One such low pressure switch is manufactured by The Berg Manufacturing Company, a Division of the Echlin Manufacturing Company, Part No. 751. In the interest of concise description, and since numerous low pressure switches, lights, buzzers, power supplies and mechanical and electrical coupling arrangements are well known in the art and may be employed without departing from the nature and scope of the invention, they are not described in greater detail herein.

The use and operation of the preferred embodiment of the low pressure indicator 10 of this invention is as follows:

The low pressure selector 12 is shown in the drawings with the internal components in the position assumed when substantially equal pressures are being supplied to the inlet ports 18 and 20 by the pair of pressure sources 30 and 32 (FIG. 5) during charging of the system. The piston 72 is held in the first position (as shown in FIG. 1) by the spring 88. The sealing member 92 sealably engages the wall 46 while the sealing member 94 is disengaged from the wall 46. Pressure of and fluid from the pressure source 32 appearing at the inlet port 20 is communicated through the passage 68, the annular passage 82, and the passage 70 to the outlet port 22, while communication of the pressure of and fluid from the pressure source 30 appearing at the inlet port 18 to the outlet port 22 is prevented by the seal formed between the sealing member 92 and the wall 46.

Upon a reduction in pressure at the inlet port 20 relative to the pressure at the inlet port 18, a pressure differential is developed; this pressure differential acts upon the piston 72 in cooperation with the spring 88 to maintain the piston in the first position, shown in the drawings. Thus, the pressure of and fluid from the pressure source 32, the lower pressure source of the pair of pressure sources, are communicated to the outlet port 22 in the same manner as when pressures supplied at the two inlet ports are substantially equal, i.e., pressure of and fluid from the pressure source 32 appearing at inlet 20 are communicated to the outlet 22 while communication of the pressure of and fluid from the pressure source 30 appearing at the inlet port 18 is prevented by the seal formed between the sealing member 92 and the wall 46.

Upon a reduction in pressure at the inlet port 18 relative to the pressure at the inlet port 20, a pressure differential is developed; this pressure differential, however, acts counter to the spring 88, urging the piston to the second position. The spring 88 has a small spring rate or constant and while effective to prevent locking of the piston 72 during charging, its effect during operation of the selector 12 is de minimus. Therefore, the pressure differential required to overcome the force of the spring and thus to cause the piston to move to the second position is small.

When the piston 72 is in the second position the sealing member 94 sealably engages the inside wall 46 while the sealing member 92 is disengaged from the inside wall 46. Pressure of and fluid from the pressure source 30 appearing at the inlet port 18 is communicated through the passage 66, the annular passage 82, and the passage 70 to the outlet port 22, while communication of the pressure of and fluid from the pressure source 32 appearing at the inlet port 20 to the outlet port 22 is prevented by the seal formed between the sealing member 94 and the wall 46. In this manner, the pressure of and fluid from the pressure source 30, i.e., the lower pressure source of the pair of pressure sources, are communicated to the outlet port 22, while communication of the pressure of and fluid from the pressure source 32 appearing at the inlet port 20 is prevented by the seal formed between the sealing member 94 and the wall 46.

In an alternate embodiment of the low pressure indicator apparatus constructed in accordance with the present invention, seen generally at 100 in FIG. 2, the low pressure selector 12 is employed with a low pressure responsive monitor shown generally at 102. The low pressure responsive monitor 102 is connected to the outlet port 22 of the low pressure selector 12 and comprises generally a housing 104, a piston 106 for reciprocating movement within the housing 104 in response to pressure appearing at the outlet port 22, a helical, compression spring 108 of a predetermined spring rate or constant which biases the piston 106 toward the outlet port 22 aa shown in the drawings, a ball 110 displaced by movement of the piston 106, a pivot arm 112 operated by movement of the ball 110 and a warning flag 114 (partially shown in FIG. 2) operated by movement of the pivot arm 112. One such low pressure responsive monitor is the Automatic Low-Pressure Signal monitor, Part No. 920, manufactured by The Berg Manufacturing Company, a Division of The Echlin Manufacturing Company.

The use and operation of the low pressure indicator 100 of this invention is as follows:

The pressure of and fluid from the lower pressure source of the pair of pressure sources is communicated to the outlet port 22 of the low pressure selector 12 in the same manner as heretofore described under the use and operation of the low pressure indicator 10. As is apparent to one skilled in the art to which this invention pertains, such pressure appearing at the outlet port 22 exerts a force on the piston 106, counter to the force exerted on the piston 106 by the spring 108. When the pressure at the outlet port 22 exceeds a preset minimum, the force exerted on the piston by such pressure is sufficient to maintain the piston 106 in a first position away from the outlet port 22 (not shown by the drawings). When the piston 106 is in the first position, the ball 110 is displaced by the piston 106, the pivot arm 112 is moved by the ball 110, and the warning flag is, in turn, moved by the pivot arm, such that the warning flag is not displayed. Upon a reduction in the pressure appearing at the outlet port 22 below the preset minimum, the force exerted by such pressure is not sufficient to counter the force of the spring 108, and the piston 106 will move toward the outlet port 22 to a second position (as shown). When the piston 106 is in the second position, the pivot arm 112, no longer acted upon by the ball 110, moves under its own weight and the weight of the warning flag 114, thereby causing the warning flag 114 to be displayed.

From the above description, it is apparent that the objects of the present invention have been achieved. While only certain embodiments have been set forth, alternative embodiments and various modifications will be apparent from the above description to those skilled in the art. These alternate embodiments are considered equivalents and within the spirit and scope of the present invention.

What is claimed is:

1. Low pressure selector apparatus adapted for connection to at least two sources of pneumatic pressure, comprising: a housing, including a cavity formed by walls therein and first, second and third ports, said second and third ports being adapted for connection to such pneumatic sources, respectively, and all of said ports communicating with said cavity, and piston means mounted for reciprocating movement within said cavity between first and second positions in response to pressure appearing at said second and third ports, a drop in pressure appearing at said third port relative to pressure appearing at said second port causing said piston means to move to said first position and a drop in pressure appearing at said second port relative to pressure appearing at said third port causing said piston means to move to said second position, said piston means including sealing means for cooperation with said walls forming said cavity to permit communication between said first port and said third port and prevent communication between said first port and said second port when said piston means is in said first position and to permit communication between said first port and said second port and prevent communication between said first port and said third port when said piston means is in said second position.

2. The apparatus of claim 1 wherein said walls form said cavity into first, second and third portions, in communication with said first, second and third ports, respectively, said second and third portions at least including segments of greater cross section than said first portion, said second portion being disposed adjacent one end of said first portion and said third portion being disposed at the distal end of said first portion.

3. The apparatus of claim 2 wherein said sealing means includes first and second sealing members, said first sealing member being disposed to sealingly engage said wall forming said first portion when said piston means is in said first position and said second sealing member being disposed to sealingly engage said wall forming said first portion when said piston means is in said second position, said sealing members being mutually disposed for sealing engagement of only one of said sealing members with said wall forming said first portion at least when said piston means is in said first and second positions.

4. The apparatus of claim 3 wherein at least one of said first and second sealing members slidably engages said wall forming said first portion to at least partially define the axis of movement of said piston means.

5. The apparatus of claim 2 wherein said first portion comprises a substantially cylindrical portion and said second and third portions comprise substantially non-cylindrical portions, respectively.

6. The apparatus of claim 5 wherein said second and third portions comprise substantially frustoconical sections.

7. The apparatus of claim 1 wherein said piston means comprises a piston mounted within said cavity for such reciprocating movement in response to pressure appearing at said second and third ports between said first position and said second position, said piston including an annular depression circumferentially about said piston for communicating pressure about said piston to access said first port.

8. The apparatus of claim 1 further comprising means for urging said piston means to said first position.

9. The apparatus of claim 8 wherein said means for urging said piston means to said first position comprises a compression spring axially aligned with said piston means and engaging said piston means and one of said walls forming said cavity to at least partially define the axis of movement of said piston means.

10. Low pressure selector apparatus adapted for connection to at least two sources of pneumatic pressure, comprising:
  a housing, including first, second and third ports and a cavity formed by walls therein, said second and third ports being adapted for connection to such pneumatic sources, respectively, said cavity including a first wall forming a first cavity portion of a first cross section and second and third walls forming second and third cavity portions at least including segments of greater cross section than said first portion, said second and third cavity portions adjoining opposite ends of said first cavity portion, said first, second and third ports communicating with said first, second and third cavity portions, respectively;
  a piston mounted for reciprocating movement within said cavity between first and second positions in response to pressure appearing at said second and third ports, a drop in pressure appearing at said third port relative to pressure appearing at said second port causing said piston to move to said first position and a drop in pressure appearing at said second port relative to pressure appearing at said third port causing said piston to move to said second position, said piston including first and second surface portions at its respective ends and a third surface portion disposed between said first and second surface portions and including an annular depression circumferentially about said piston for communicating pressure about said piston to access said first port;
  first and second sealing members mounted on said first and second surface portions of said piston, at least one of said first and second sealing members being disposed to slidably engage said first wall of said cavity to at least partially define the axis of movement of said piston, said first sealing member being disposed to be in sealing engagement with said first wall when said piston is in said first position to prevent communication between said first port and said second port, and said second sealing member being disposed to be in sealing engagement with said first wall when said piston is in said second position to prevent communication between said first port and said third port, said sealing members being mutually disposed for sealing engagement of only one of said sealing members with said first wall at least when said piston is in said first or second positions and for cooperation with said second and third walls to permit communication between said first port and said third port when said piston is in said first position and to permit communication between said first port and said second port when said piston is in said second position.

11. The apparatus of claim 10 further comprising means for urging said piston to said first position.

12. The apparatus of claim 11 wherein said means for urging said piston to said first position comprises a compression spring coaxially aligned with said piston and engaging said piston and one of said walls forming said cavity to at least partially define the axis of movement of said piston.

13. Low pressure indicator apparatus for monitoring at least two sources of supply pressure in a vehicle pneumatic brake system, comprising:
  a housing, including a cavity formed by walls therein and first, second and third ports, said second and third ports being adapted for connection to said sources of supply pressure and all of said ports communicating with said cavity;
  piston means mounted for reciprocating movement within said cavity between first and second positions in response to pressure appearing at said second and third ports, a drop in pressure appearing at said third port relative to pressure appearing at said second port causing said piston means to move to said first position and a drop in pressure appearing at said second port relative to pressure appearing at said third port causing said piston means to move to said second position, said piston means including sealing means for cooperation with said walls forming said cavity to permit communication between said first port and said third port and prevent communication between said first port and said second port when said piston means is in said first position and to permit communication between said first port and said second port and prevent communication between said first port and said third port when said piston means is in said second position; and
  pressure responsive monitoring means connected to said third port for signaling reduction in pressure appearing at said third port below a preset minimum.

14. The apparatus of claim 13 further comprising means for urging said piston means to said first position.

15. The apparatus of claim 13 wherein said monitoring means comprises a low pressure switch connected to said third port and annunciator means electrically connected to said low pressure switch.

16. Low pressure indicator apparatus for monitoring at least two sources of supply pressure in a vehicle pneumatic brake system, comprising:
  a housing, including first and second chambers formed by walls therein, a passage for providing communication between said first and second chambers and first and second ports adapted for connection to such sources of supply pressure, said first and second ports being in communication with said first chamber;

first piston means mounted within said first chamber for reciprocating movement therein between first and second positions in response to pressure appearing at said first and second ports, a drop in pressure appearing at said second port relative to pressure appearing at said first port causing said first piston means to move to said first position and a drop in pressure appearing at said first port relative to pressure appearing at said second port causing said first piston means to move to said second position, said first piston means including sealing means for cooperation with said walls forming said first chamber to permit communication of pressure between said second port and said passage and prevent communication of pressure between said first port and said passage when said first piston means is in said first position and to permit communication of pressure between said first port and said passage and prevent communication of pressure between said second port and said passage when said first piston means is in said second position;

second piston means mounted within said second chamber for reciprocating movement therein between first and second positions in response to pressure appearing at said passage;

means for urging said second piston means to said second position; and flag means mounted on said housing for indicating when said second piston means is in said second position.

17. The apparatus of claim 16 further comprising means for urging said first piston means to said first position.

18. A vehicle pneumatic system including a low pressure selector, at least two sources of supply pressure and pressure responsive monitoring means, the low pressure selector comprising:

a housing, including a cavity formed by walls therein and first, second and third ports, said first, second and third ports being adapted for connection respectively to said pressure responsive monitor means and said sources of supply pressure;

piston means mounted for reciprocating movement within said cavity between first and second positions in response to pressure appearing at said second and third ports, a drop in pressure appearing at said third port relative to pressure appearing at said second port causing said piston means to move to said first position and a drop in pressure appearing at said second port relative to pressure appearing at said third port causing said piston means to move to said second position, said piston means including sealing means for cooperation with said walls forming said cavity to permit communication of pressure between said first port and said third port and prevent communication of pressure between said first port and said second port when said piston means is in said first position and to permit communication of pressure between said first port and second port and prevent communication of pressure between said first port and said third port when said piston means is in said second position.

* * * * *